US011352260B2

(12) United States Patent
Kim et al.

(10) Patent No.: US 11,352,260 B2
(45) Date of Patent: Jun. 7, 2022

(54) BUNDLE-TYPE CARBON NANOTUBES AND METHOD FOR PREPARING THE SAME

(71) Applicant: LG CHEM, LTD., Seoul (KR)

(72) Inventors: Sung Jin Kim, Daejeon (KR); Jae Keun Yoon, Daejeon (KR); Dong Hyun Cho, Daejeon (KR); Hyun Joon Kang, Daejeon (KR); Byung Yul Choi, Daejeon (KR); Duk Ki Kim, Daejeon (KR); Hyun Woo Park, Daejeon (KR); Hyo Sang You, Daejeon (KR)

(73) Assignee: LG CHEM, LTD, Seoul (KR)

( * ) Notice: Subject to any disclaimer, the term of this patent is extended or adjusted under 35 U.S.C. 154(b) by 342 days.

(21) Appl. No.: 16/318,973

(22) PCT Filed: Mar. 16, 2018

(86) PCT No.: PCT/KR2018/003126
§ 371 (c)(1),
(2) Date: Jan. 18, 2019

(87) PCT Pub. No.: WO2018/169366
PCT Pub. Date: Sep. 20, 2018

(65) Prior Publication Data
US 2019/0263662 A1 Aug. 29, 2019

(30) Foreign Application Priority Data
Mar. 17, 2017 (KR) .................. 10-2017-0033558
Mar. 15, 2018 (KR) .................. 10-2018-0030108

(51) Int. Cl.
*C01B 32/162* (2017.01)
*H01B 1/04* (2006.01)
*B01J 23/847* (2006.01)

(52) U.S. Cl.
CPC ......... *C01B 32/162* (2017.08); *B01J 23/8472* (2013.01); *H01B 1/04* (2013.01); *C01B 2202/02* (2013.01); *C01B 2202/06* (2013.01); *C01B 2202/08* (2013.01); *C01B 2202/22* (2013.01); *C01B 2202/32* (2013.01); *C01P 2006/10* (2013.01); *C01P 2006/11* (2013.01); *C01P 2006/12* (2013.01); *C01P 2006/40* (2013.01)

(58) Field of Classification Search
None
See application file for complete search history.

(56) References Cited

U.S. PATENT DOCUMENTS

| 8,562,937 B2 | 10/2013 | Carruthers et al. |
| 9,956,546 B2 | 5/2018 | Kim et al. |
| 2007/0179051 A1 | 8/2007 | Mihan et al. |
| 2009/0099016 A1 | 4/2009 | Carruthers et al. |
| 2010/0062229 A1* | 3/2010 | Hata ............ B82Y 30/00 428/195.1 |
| 2010/0266478 A1 | 10/2010 | Kim et al. |
| 2011/0008617 A1 | 1/2011 | Hata et al. |
| 2013/0337707 A1 | 12/2013 | Hata et al. |
| 2014/0255698 A1 | 9/2014 | Kang et al. |
| 2014/0309105 A1 | 10/2014 | Kang et al. |
| 2015/0273441 A1 | 10/2015 | Kim et al. |
| 2015/0274529 A1 | 10/2015 | Kim et al. |
| 2015/0298974 A1 | 10/2015 | Kim et al. |
| 2015/2703441 | 10/2015 | Kim et al. |
| 2016/0214863 A1 | 7/2016 | Kim et al. |
| 2018/0016146 A1 | 1/2018 | Hata et al. |
| 2018/0162734 A1 | 6/2018 | Kang et al. |

FOREIGN PATENT DOCUMENTS

| CN | 103827027 A1 | 5/2014 |
| CN | 103958061 A1 | 7/2014 |
| CN | 106103343 A1 | 11/2016 |
| EP | 3053877 A1 | 8/2016 |
| JP | 2009-528238 A | 8/2009 |
| JP | 2011-047081 A | 3/2011 |
| JP | 2014-208328 A | 11/2014 |
| KR | 10-2007-0028327 A | 3/2007 |
| KR | 10-2008-0078879 A | 8/2008 |
| KR | 10-2010-0067048 A | 6/2010 |
| KR | 10-2015-0027675 A | 3/2015 |
| KR | 10-2015-0037601 A | 4/2015 |
| KR | 10-2015-0142408 A | 12/2015 |
| KR | 10-2016-0125030 A | 10/2016 |
| WO | 2012-081601 A | 6/2012 |
| WO | 2015047048 A1 | 4/2015 |

OTHER PUBLICATIONS

KR20150142408; Google translation Jun. 1, 2021.*

* cited by examiner

*Primary Examiner* — Guinever S Gregorio
(74) *Attorney, Agent, or Firm* — Dentons US LLP

(57) ABSTRACT

The present invention relates to a bundle-type carbon nanotube which has a bulk density of 25 to 45 kg/m$^3$, a ratio of the bulk density to a production yield of 1 to 3, and a ratio of a tap density to the bulk density of 1.3 to 2.0, and a method for preparing the same.

7 Claims, No Drawings

BUNDLE-TYPE CARBON NANOTUBES AND METHOD FOR PREPARING THE SAME

This application is a National Stage Entry of International Application No. PCT/KR2018/003126, filed on Mar. 16, 2018, and claims the benefit of and priority to Korean Application No. 10-2017-0033558, filed on Mar. 17, 2017, and Korean Application No. 10-2018-0030108, filed on Mar. 15, 2018, all of which are hereby incorporated by reference in their entirety for all purposes as if fully set forth herein.

TECHNICAL FIELD

The present invention relates to a bundle-type carbon nanotubes and a method for preparing the same, and more particularly, to a bundle-type carbon nanotubes which have a ratio of a bulk density to a production yield of 1 to 3, and a ratio of a tap density to a bulk density of 1.3 to 2, and a method for preparing the same.

BACKGROUND

A carbon nanotube, which is a type of fine carbon fiber, is a tube-type carbon having an average diameter of 1 μm or less, and is expected to be applied and commercialized in various fields due to high conductivity, tensile strength and thermal resistance, caused by its specific structure. However, despite the usefulness of such a carbon nanotube, there is a limitation on the use of a carbon nanotube because of low solubility and dispersibility. Therefore, a carbon nanotube was used by being dispersed in a dispersion medium and preparing a conductive material dispersion. However, there is a problem of aggregation since carbon nanotubes are not stably dispersed in a dispersion medium due to strong Van der Waals attraction between them.

Various attempts have been made to solve such a problem. Specifically, a method for dispersing carbon nanotubes in a dispersion medium through mechanical dispersion treatment such as ultrasonic treatment has been suggested. However, in this case, while an ultrasonic wave is applied, the carbon nanotubes have excellent dispersibility, but when application of an ultrasonic wave is ended, the carbon nanotubes begin to agglomerate. In addition, methods for dispersing and stabilizing carbon nanotubes using various dispersing agents have been suggested. However, these methods also have a problem in that the carbon nanotubes become difficult to handle due to increased viscosity when being dispersed in a dispersion medium at a high concentration.

Therefore, it is required to develop carbon nanotubes with improved dispersibility without a decrease in conductivity.

SUMMARY

Technical Problem

The present invention provides a bundle-type carbon nanotube with excellent dispersibility and a method for preparing the same.

Technical Solution

To achieve the object, the present invention provides a bundle-type carbon nanotube having a bulk density of 25 to 45 kg/m³ and satisfying the following Equations 1 and 2:

$1.0 \leq x/y \leq 3.0$ ≤Equation 1>

$1.3 \leq z/x \leq 2.0$ ≤Equation 2>

In Equations 1 and 2,
x is a number representing a bulk density (units: kg/m³) of the bundle-type carbon nanotube,
y is a number representing a production yield of the bundle-type carbon nanotube, wherein production yield=[(total weight of prepared carbon nanotube)−(weight of supported catalyst used in preparation)]/(weight of supported catalyst used in preparation), and
z is a number representing a tap density (units: kg/m³) of the bundle-type carbon nanotube.

In addition, the present invention provides a method for preparing a bundle-type carbon nanotube, which comprises: preparing a mixture comprising an organic acid and a vanadium-based compound in a molar ratio of 1:(1 to 30); preparing a catalyst precursor comprising the mixture and a cobalt-based compound; performing first thermal treatment of aluminum hydroxide to prepare a support; supporting the catalyst precursor in the support and performing second thermal treatment under a pressure of 0.1 to 2 bar to prepare a supported catalyst; and reacting the supported catalyst with a carbon-based compound.

In addition, the present invention provides a conductive material dispersion including the bundle-type carbon nanotube.

Advantageous Effects

Since the bundle-type carbon nanotube of the present invention has excellent dispersibility and dispersion stability, in preparation of a conductive material dispersion, the bundle-type carbon nanotube may exhibit the same level of dispersibility as an entangled-type carbon nanotube, and excellent conductivity.

DETAILED DESCRIPTION

Hereinafter, the present invention will be described in further detail to help in understanding of the present invention.

The terms and words used in the specification and the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

The term "carbon nanotube" used herein is a secondary structure formed by combining units of carbon nanotubes entirely or partially in a bundle form, and the unit of the carbon nanotube is a cylindrical graphite sheet with a nanoscale diameter and a sp² hybridization structure. Here, according to an angle and a structure of rolling the graphite sheet, a conductor or semiconductor characteristic may be exhibited. According to a number of bonds forming the wall of the carbon nanotube unit, the carbon nanotube unit may be classified into a single-walled carbon nanotube (SWCNT), a double-walled carbon nanotube (DWCNT) and a multi-walled carbon nanotube (MWCNT), and the smaller the wall thickness, the lower the resistance.

The bundle-type carbon nanotube of the present invention may comprise any one or two or more of the single-, double- and multi-walled carbon nanotube units.

The term "bundle type" used herein, unless particularly defined otherwise, refers to a bundle- or rope-type secondary form, in which a plurality of carbon nanotube units having axes in a unit length direction arranged parallel to substantially the same orientation, or are twisted or entangled after arrangement.

The term "non-bundle type or entangled type" refers to a state in which the carbon nanotube units are entangled without a certain form such as a bundle or rope type.

Since the bundle-type carbon nanotube may be loosely connected, compared to the entangled-type carbon nanotube, the carbon nanotube units are relatively easily disentangled in dispersing and rapidly dispersed, and therefore it may be difficult to disperse the carbon nanotubes at a high concentration. However, the length of the carbon nanotube after dispersion may be maintained longer, resulting in excellent conductivity.

The entangled-type carbon nanotube may be slowly dispersed but can be dispersed at a high concentration since the carbon nanotube units are randomly entangled. However, through dispersion, if the entangled units of the carbon nanotube are forcefully unraveled with an external force, the units of the carbon nanotube may be dispersed while being cut. Therefore, the length of the unit of the carbon nanotube in the entangled-type carbon nanotube may be shorter than that of the bundle-type carbon nanotube, resulting in a decrease in conductivity.

In the present invention, the bulk density of the bundle-type carbon nanotube may be measured according to ASTM B329, and particularly, may be measured according to ASTM B329-06. In addition, the bulk density of the bundle-type carbon nanotube may be measured using a Scott volumeter (Version USP 616).

In the present invention, the bulk density of the bundle-type carbon nanotube may be measured according to laboratory conditions, and even when being measured according to laboratory conditions, substantially the same result as that according to the above-mentioned specification may be deduced.

When measured in a laboratory, a 25-ml cylinder (Manufacturer: Ronyes, Material: glass) was put on a scale and adjusted to a zero point. The bundle-type carbon nanotube was added to the cylinder, and then a bulk density may be calculated by the following Equation 3 after a volume was measured by reading a mark by positioning the height at eye level, and a weight was measured after the cylinder was put on a scale.

Bulk density (kg/m³)=weight of bundle-type carbon nanotube (kg)/volume of bundle-type carbon nanotube (m³) <Equation 3>

In the present invention, the tap density of the carbon nanotube may be measured using a conventional tap density meter. Specifically, the tap density may be measured according to ASTM B527-06, and measured using TAP-2S (Trade Name, Manufacturer: LOGAN).

In the present invention, the tap density of the carbon nanotube may also be measured according to laboratory conditions, and even when being measured according to laboratory conditions, substantially the same result as that according to the specification may be deduced.

When measured in a laboratory, a 25-ml cylinder (Manufacturer: Ronyes, Material: glass) was put on a scale and adjusted to a zero point. After the carbon nanotube was added to the cylinder, a volume may be measured by reading a mark by positioning the height at eye level, and a weight was measured after the cylinder was put on a scale. After gently tapping the cylinder on a table approximately 100 times, the mark on the cylinder was read to measure a volume, and then the tap density may be calculated according to the following Equation 4.

Tap density (kg/m³)=(weight of bundle-type carbon nanotube (kg)/(volume of bundle-type carbon nanotube after tapping 100 times (m³)) <Equation 4>

In the present invention, a production yield may be calculated by the following Equation 5.

Production yield=[(total weight of the prepared carbon nanotube)−(weight of supported catalyst used in preparation)]/(weight of supported catalyst used in preparation). <Equation 5>

In the present invention, the specific surface area of the bundle-type carbon nanotube is measured by a BET method, and for example, may be calculated from an adsorption amount of nitrogen gas at a liquid nitrogen temperature (77K) using BELSORP-mini II (Trade Name, Manufacturer: BEL Japan).

In the present invention, an average strand diameter and length of the carbon nanotube unit may be measured using a field-emission scanning electron microscope.

1. Bundle Type Carbon Nanotube

A bundle-type carbon nanotube according to an exemplary embodiment of the present invention has a bulk density of 25 to 45 kg/m³, and satisfies the following Equations 1 and 2:

$$1.0 \leq x/y \leq 3.0 \quad \text{<Equation 1>}$$

$$1.3 \leq z/x \leq 2.0 \quad \text{<Equation 2>}$$

In Equations 1 and 2, x is a number representing a bulk density (units: kg/m³) of the bundle-type carbon nanotube, y is a number representing a production yield of the bundle-type carbon nanotube, and z is a number representing a tap density (units: kg/m³) of the bundle-type carbon nanotube.

The bundle-type carbon nanotube has a bulk density of 25 to 45 kg/m³, preferably 25 to 40 kg/m³.

When the bulk density of the bundle-type carbon nanotube is less than the above-mentioned range, the viscosity of a solution of the bundle-type carbon nanotubes in a dispersion medium is drastically increased, and thus a concentration of bundle-type carbon nanotube in solution may not be increased. When the bulk density exceeds the above-mentioned range, the length of the carbon nanotube unit in a dispersion medium becomes shorter, and powder resistivity is increased, resulting in degraded conductivity.

Equations 1 and 2 are indicators of an internal structure of the bundle-type carbon nanotube, and since the bundle-type carbon nanotube satisfying both of Equations 1 and 2 is packed between carbon nanotube units constituting the bundle-type carbon nanotube, compared to a conventional bundle-type carbon nanotube, both properties of the bundle-type carbon nanotube and the entangled-type carbon nanotube may be obtained at the same time.

As a result, since the bundle-type carbon nanotube may be slowly dispersed in a dispersion medium like the entangled-type carbon nanotube, it may be dispersed at a high concentration. In addition, since the units of the bundle-type carbon nanotube are easily disentangled in a dispersion medium during dispersion, compared to the entangled-type carbon nanotube, the dispersed bundle-type carbon nanotube may have longer carbon nanotube units. Therefore, when a conductive material dispersion comprising the bundle-type carbon nanotube is introduced to an electrode, the conductive material dispersion may be present between active materials and a conductive pathway may be easily ensured.

A value of Equation 1 ranges from 1.0 to 3.0, preferably 1.5 to 2.5.

When the value satisfies the above-mentioned range, the bundle-type carbon nanotube has both excellent conductivity and dispersibility.

When the value is less than the above-mentioned range, due to decreased dispersibility, it is difficult for the bundle-type carbon nanotube to be dispersed at a high concentration in a dispersion medium. When the value exceeds the above-mentioned range, since the carbon nanotube does not have a bundle-type structure, the carbon nanotube units are cut while being dispersed in a dispersion medium, and thus conductivity is degraded.

The value of Equation 2 ranges from 1.3 to 2.0, preferably 1.4 to 1.7.

When the value satisfies the above-mentioned range, the bundle-type carbon nanotube has excellent conductivity and dispersibility.

When the value is less than the above-mentioned range, since the carbon nanotube does not have a bundle-type structure, the carbon nanotube units are cut while being dispersed in a dispersion medium, and thus conductivity is degraded.

When the value exceeds the above-mentioned range, since the bundle-type carbon nanotube has a very loose bundle structure, dispersion proceeds very rapidly in a dispersion medium and thus the carbon nanotube is not dispersed at a high concentration.

When the bundle-type carbon nanotube satisfies Equation 1, but does not satisfy Equation 2, the bundle-type carbon nanotube is decreased in conductivity, and dispersion at a high concentration is difficult.

In addition, when the bundle-type carbon nanotube satisfies Equation 2, but does not satisfy Equation 1, the bundle-type carbon nanotube is not dispersed at a high concentration.

A production yield of the bundle-type carbon nanotube may range from 10 to 40 or 15 to 30, and 15 to 30 is preferable.

When the value satisfies the above-mentioned range, a bundle-type carbon nanotube having a bulk density, which may be dispersed in a dispersion medium at a high concentration, may be prepared.

In addition, the bundle-type carbon nanotube may have a tap density of 35 to 70 kg/m$^3$, 45 to 60 kg/m$^3$ or 45 to 55 kg/m$^3$, and among these, 45 to 55 kg/m$^3$ is preferable.

When the value satisfies the above-mentioned range, a bundle-type carbon nanotube, which may be dispersed in a dispersion medium at a high concentration, may be produced.

The bundle-type carbon nanotube may have a BET specific surface area of 150 m$^2$/g to 300 m$^2$/g or 160 m$^2$/g to 220 m$^2$/g, and among these, 160 m$^2$/g to 220 m$^2$/g is preferable.

When the value satisfies the above-mentioned range, the bundle-type carbon nanotube may be dispersed in a conductive material dispersion at a high concentration.

Here, an average strand diameter of a unit of the bundle-type carbon nanotube may be 30 nm or less or 10 to 30 nm, and among these, 10 to 30 nm is preferable.

When the value satisfies the above-mentioned range, since the absolute strand number of a carbon nanotube unit per volume is suitably maintained, the dispersibility and conductivity of the bundle-type carbon nanotube may be enhanced.

The average length of a unit of the carbon nanotube may be 0.5 to 200 μm or 10 to 60 μm, and among these, 10 to 60 μm is preferable.

When the value satisfies the above-mentioned range, the bundle-type carbon nanotube may have excellent conductivity and strength, and may be stable at both room temperature and a high temperature.

The carbon nanotube unit may have an aspect ratio, which is defined as a ratio of a length of the carbon nanotube unit (the length of the major axis crossing the center of the unit) to a diameter (the length of the minor axis crossing the center of the unit and perpendicular to the major axis), of 5 to 50,000, preferably 10 to 20,000.

When the value satisfies the above-mentioned range, the bundle-type carbon nanotube may have excellent conductivity.

2. Method for Preparing Bundle-Type Carbon Nanotube

A method for preparing a bundle-type carbon nanotube according to another exemplary embodiment of the present invention may include: 1) preparing a mixture comprising an organic acid and a vanadium-based compound in a molar ratio of 1:(1 to 30) (step 1); 2) preparing a catalyst precursor comprising the mixture and a cobalt-based compound (step 2); 3) performing first thermal treatment of aluminum hydroxide to prepare a support (step 3); 4) supporting the catalyst precursor in the support and performing second thermal treatment under a pressure of 0.1 to 2 bar to prepare a supported catalyst (step 4); and 5) reacting the supported catalyst with a carbon-based compound (step 5).

Hereinafter, the method for preparing a bundle-type carbon nanotube according to anther exemplary embodiment of the present invention will be described in detail.

1) Step 1

First, a mixture comprising an organic acid and a vanadium-based compound in a molar ratio of 1:(1 to 30) is prepared.

The mixture may comprise the organic acid and the vanadium-based compound in a molar ratio of 1:(2 to 10).

When the molar ratio of the organic acid and the vanadium-based compound satisfies the above-mentioned range, a bundle-type carbon nanotube satisfying Equations 1 and 2 may be prepared through a synergistic action with second thermal treatment that will be described below.

When the ratio is less than the above-mentioned range, a bundle-type carbon nanotube may not be prepared, and when the ratio exceeds the above-mentioned range, production yield is decreased.

The organic acid may be at least one selected from the group consisting of citric acid, tartaric acid, fumaric acid, malic acid, acetic acid, butyric acid, palmitic acid and oxalic acid, and among these, citric acid is preferable.

The vanadium-based compound may be at least one selected from the group consisting of $NH_4VO_3$, $NaVO_3$, $V_2O_5$ and $V(C_5H_7O_2)_3$, and among these, $NH_4VO_3$ is preferable.

2) Step 2

Subsequently, a catalyst precursor comprising the mixture and a cobalt-based compound is prepared.

The catalyst precursor may comprise the mixture and the cobalt-based compound such that a molar ratio of vanadium and cobalt is 1:(1 to 100), preferably 1:(5 to 20).

When the ratio satisfies the above-mentioned range, a production yield of the bundle-type carbon nanotube is increased.

The cobalt-based compound may be at least one selected from the group consisting of $Co(NO_3)_2 \cdot 6H_2O$, $Co_2(CO)_8$ and $[Co_2(CO)_6(t\text{-}BuC\equiv CH)]$, and among these, $Co(NO_3)_2 \cdot 6H_2O$ is preferable.

The mixture and the cobalt-based compound, that is, the organic acid, the vanadium-based compound and the cobalt-based compound may be used in the form of a solution prepared with a solvent, and the solvent may be at least one selected from the group consisting of water, methanol and ethanol, and among these, water is preferable.

A total concentration of the citric acid, the vanadium-based compound and the cobalt-based compound in the solution may be 0.1 to 3 g/ml, 0.5 to 2 g/ml, or 0.7 to 1.5 g/ml, and among these, 0.7 to 1.5 g/ml is preferable.

When the concentration satisfies the above-mentioned range, a support to be described below may be uniformly support a catalytic precursor.

The catalyst precursor may help to form a hexagonal ring structure by bonding carbon components present in a gas-phase carbon source.

3) Step 3

Subsequently, a support is prepared through first thermal treatment of aluminum hydroxide ($Al(OH)_3$).

The aluminum hydroxide ($Al(OH)_3$) may be pretreated before the first thermal treatment is performed.

The pretreatment may be carried out at 50 to 150° C. for 1 to 24 hours.

When the pretreatment is performed under the above-mentioned conditions, a remaining solvent or impurities, which is(are) present on the surface of the aluminum hydroxide, may be removed.

The aluminum hydroxide may have an average particle diameter of 20 to 200 μm or 30 to 100 μm, preferably 30 to 60 μm.

When the average particle diameter satisfies the above-mentioned range, the aluminum hydroxide may be easily loaded in an apparatus for preparing a bundle-type carbon nanotube, and specifically, a parallel fixed bed reactor or fluidized bed reactor.

The aluminum hydroxide may have a porosity of 0.1 to 1.0 $cm^3/g$, and a specific surface area of less than 1 $m^2/g$.

The first thermal treatment may be performed at 250 to 500° C. or 400 to 500° C., and among these, 400 to 500° C. is preferable. In addition, the first thermal treatment may be performed in an air atmosphere.

When the temperature satisfies the above-mentioned condition, a support in which aluminum hydroxide is converted into 30 wt % or more of $AlO(OH)$ and 70 wt % or less of $Al(OH)_3$, and particularly, 40 wt % or more of $AlO(OH)$ and 60 wt % or less of $Al(OH)_3$, and $Al_2O_3$ is not included may be prepared.

The support may further comprise a metal oxide such as $ZrO_2$, $MgO$ and $SiO_2$.

A shape of the support may be, but is not particularly limited to, a sphere or potato shape. In addition, the support may have a porous, molecular sieve, or honeycomb structure so as to have a relatively high surface area per unit mass or unit volume.

4) Step 4

Subsequently, a supported catalyst is prepared by supporting a catalyst precursor in the support and performing second thermal treatment under a pressure of 0.1 to 2 bar.

The supporting may be performed by uniformly mixing the support with the catalyst precursor, and performing aging for a predetermined time.

The mixing may be performed at 45 to 80° C. or 50 to 70° C., and among these, 50 to 70° C. is preferable.

When the temperature satisfies the above-mentioned condition, the catalyst precursor solution may not be precipitated, and may be uniformly mixed with the support.

The mixing may be performed by rotation or stirring.

The aging may be performed for 3 to 60 minutes or 10 to 60 minutes, and among these, 10 to 60 minutes is preferable.

When the above-mentioned condition is satisfied, the catalyst precursor may be uniformly supported by the support.

After the catalyst precursor may be supported by the support, drying may be further performed.

The drying may be performed at 60 to 200° C. or 100 to 200° C., and among these, 100 to 200° C. is preferable.

The drying may be performed for 4 to 16 hours or 10 to 16 hours, and among these, 10 to 16 hours is preferable.

When the above-mentioned drying condition is satisfied, sufficient drying may be performed.

The pressure in the second thermal treatment, 0.1 to 2 bar, may be measured as an internal pressure of a container (hereinafter, referred to as a second thermal treatment container) in which second thermal treatment is performed, that is, a pressure additionally applied with atmospheric pressure.

When the internal pressure of the second thermal treatment container is higher than the above-mentioned range due to the second thermal treatment, a lid of the second thermal treatment container may be partially opened by the internal pressure, and a gas in the container may be discharged to the outside. After the gas is discharged, the internal pressure of the second thermal treatment container returns to the above-mentioned range, and the lid may be closed again. The second thermal treatment may be performed while repeating such a process.

When the pressure satisfies the above-mentioned condition, a bundle-type carbon nanotube having properties of an entangled-type carbon nanotube, that is, a bundle-type carbon nanotube capable of being dispersed in a conductive material dispersion at a high concentration due to satisfaction of Equations 1 and 2, may be prepared.

When the pressure is less than the above-mentioned range, the bulk density of the bundle-type carbon nanotube is lower than a target bulk density. When the pressure exceeds the above-mentioned range, the bulk density of the bundle-type carbon nanotube is higher than the target bulk density, and thus Equation 2 may not be satisfied.

The second thermal treatment may be performed at 500 to 800° C. or 700 to 800° C., and among these, 700 to 800° C. is preferable.

When the temperature satisfies the above-mentioned range, a supported catalyst in which the surface and micropores of the support are uniformly coated with the catalyst precursor may be prepared.

The second thermal treatment may be performed for 1 to 6 hours or 2 to 5 hours, and among these, 2 to 5 hours is preferable.

When the time satisfied the above-mentioned range, a supported catalyst in which the surface and finepores of the support are uniformly coated with the catalyst precursor may be prepared.

Meanwhile, the supported catalyst may include 5 to 30 wt % of a component derived from the catalyst precursor.

5) Step 5

Subsequently, the supported catalyst reacts with a carbon-based compound.

The reaction between the supported catalyst and the carbon-based compound may be performed by chemical vapor synthesis.

Specifically, first, the supported catalyst may be introduced into a parallel fixed bed reactor or fluidized bed reactor. Subsequently, the reaction may be performed by injecting a gas-phase (hereinafter, referred to as "gaseous") carbon-based compound, or a mixed gas of the gaseous carbon-based compound, a reducing gas (e.g., hydrogen, etc.) and a carrier gas (e.g., nitrogen, etc.) at a thermal decomposition temperature or more of the gaseous carbon-based compound to a temperature lower than the melting point of a catalyst supported by the support and growing a carbon nanotube using chemical vapor synthesis through decomposition of the gaseous carbon-based compound.

The carbon nanotube prepared by chemical vapor synthesis has a direction of crystal growth which is almost parallel to a tube axis, and higher crystallinity of a graphite structure in a tube length direction. As a result, a carbon nanotube having a smaller unit diameter and high conductivity and strength may be prepared.

In addition, the reaction may be performed at 500° C. or more and less than 800° C., or at 550 to 750° C., and among these, 550 to 750° C. is preferable.

When the reaction satisfies the above-mentioned temperature range, since the bulk size of a carbon nanotube produced while the generation of amorphous carbon is minimized is maintained as it is, and its weight is reduced, dispersibility due to the decrease in bulk density may be further enhanced.

As a heat source for the reaction, induction heating, radiation heat, laser, IR, microwaves, plasma, or surface plasmon heating may be used.

In addition, as the carbon-based compound, any carbon-based compound that can provide carbon and can be present in a gas phase at 300° C. or more may be used without particular limitation.

The carbon-based compound may be a carbon-based compound having 6 or less carbon atoms, and may be one or more selected from the group consisting of carbon monoxide, methane, ethane, ethylene, ethanol, acetylene, propane, propylene, butane, butadiene, pentane, pentene, cyclopentadiene, hexane, cyclohexane, benzene and toluene.

After a carbon nanotube is grown by the above-described reaction, a cooling process for regularly aligning the carbon nanotubes may be further selectively performed. The cooling process may be performed specifically using natural cooling according to the removal of a heat source, or a cooler.

In a method for preparing a bundle-type carbon nanotube according to another exemplary embodiment of the present invention, a process of removing metal catalyst-derived metal impurities, remaining in the carbon nanotube, may be selectively performed. Here, the process of removing metal impurities may be performed according to a conventional method, for example, washing, acid treatment, etc.

3. Conductive Material Dispersion

A conductive material dispersion according to still another exemplary embodiment of the present invention comprises a bundle-type carbon nanotube according to an exemplary embodiment of the present invention.

The conductive material dispersion may include the bundle-type carbon nanotube and a dispersion medium.

The dispersion medium may be an amide-based polar organic solvent such as dimethylformamide (DMF), diethylformamide, dimethylacetamide (DMAc) or N-methyl pyrrolidone (NMP); an alcohol such as methanol, ethanol, 1-propanol, 2-propanol (isopropyl alcohol), 1-butanol (n-butanol), 2-methyl-1-propanol (isobutanol), 2-butanol(sec-butanol), 1-methyl-2-propanol(tert-butanol), pentanol, hexanol, heptanol or octanol; a glycol such as ethylene glycol, diethylene glycol, triethylene glycol, propylene glycol, 1,3-propanediol, 1,3-butanediol, 1,5-pentanediol, or hexylene glycol; a polyhydric alcohol such as glycerin, trimethylolpropane, pentaerythritol or sorbitol; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether or tetraethylene glycol monobutyl ether; a ketone such as acetone, methyl ethyl ketone, methyl propyl ketone, or cyclopentanone; or an ester such as ethyl citrate, γ-butyrolactone, or ε-propiolactone, and one or more thereof may be used. More specifically, in consideration of an effect of improving the dispersibility of the bundle-type carbon nanotube and the dispersing agent, the dispersion medium may be an amide-based polar organic solvent.

Hereinafter, examples of the present invention will be described in detail so as to be easily carried out by those of ordinary skill in the art. However, the present invention may be embodied in a variety of different forms, and is not limited to the examples which will be described herein.

<Preparation of Bundle-Type Carbon Nanotube>

EXAMPLES 1 TO 4, AND COMPARATIVE EXAMPLES 1 TO 4

A $NH_4VO_3$ aqueous solution was prepared by adding citric acid and $NH_4VO_3$ to water at a molar ratio of 1:2.27 and being dissolving. A catalyst precursor solution, which is a clear aqueous solution, was prepared by mixing $Co(NO_3)_2 \cdot 6H_2O$ with the $NH_4VO_3$ aqueous solution so as to have a Co:V molar ratio of 10:1.

Meanwhile, a support containing 40 wt % or more of AlO(OH) was prepared by performing first thermal treatment of aluminum hydroxide $(Al(OH)_3)$ in an air atmosphere at a temperature listed in Table 1 below for 4 hours.

The support was mixed with the catalyst precursor aqueous solution such that 16 mol of Co and 1.6 mol of V were contained in the catalyst precursor aqueous solution with respect to 100 mol of Al in the support.

The catalyst precursor aqueous solution was allowed to be supported by the support in a thermostatic bath at 60° C. for 5 minutes, and then dried in an air atmosphere at a temperature listed in Table 1 below for 12 hours. Subsequently, second thermal treatment was carried out in an air atmosphere under a pressure listed in Table 1 below at 720° C. for 4 hours, and thus a supported catalyst was prepared.

The supported catalyst was loaded in the lower part of a quartz tube having an inner diameter of 55 mm located in a fluidized bed reactor at an amount listed in Table 1 below. An inner temperature of the fluidized bed reactor was increased to a temperature listed in Table 1 below and maintained, and then synthesis was carried out for 2 hours while flowing nitrogen and ethylene gas at a volume ratio of 3:1 and a rate of 3.2 L/min so as to prepare a bundle-type carbon nanotube. An amount of the prepared bundle-type carbon nanotube is listed in Table 1 below.

Meanwhile, a pressure listed in Table 1 below refers to an internal pressure in a second thermal treatment container, which is additionally applied with atmospheric pressure, when the internal pressure was higher than the above-mentioned pressure, the lid of a second thermal treatment container was partially opened by an internal pressure to discharge a gas in the container to the outside, and after discharging the gas, the internal pressure of the second thermal treatment container returned to the above-mentioned range, and the lid was closed again. The second thermal treatment was carried out while repeating such a process for 4 hours.

In addition, atmospheric pressure in Table 1 below means that the second thermal treatment is carried out while the container is open.

acid and $NH_4VO_3$ to water in a molar ratio of 1:0.9 and dissolving.

COMPARATIVE EXAMPLE 7

An entangled-type nanotube (10 g) was prepared by the same method as described in Example 1, except that a $NH_4VO_3$ aqueous solution was prepared by adding citric acid and $NH_4VO_3$ to water in a molar ratio of 1:31 and dissolving.

TABLE 1

| Classification | Temperature for first thermal treatment (° C.) | Drying temperature (° C.) | Pressure for second thermal treatment (bar) | Increased temperature (° C.) | Amount of supported catalyst (g) | Amount of bundle-type carbon nanotube (g) |
| --- | --- | --- | --- | --- | --- | --- |
| Example 1 | 450 | 190 | 0.3 | 690 | 1.0 | 17.8 |
| Example 2 | 450 | 190 | 0.5 | 710 | 1.0 | 18.9 |
| Example 3 | 450 | 190 | 1.0 | 730 | 1.0 | 21.0 |
| Example 4 | 450 | 120 | 1.0 | 730 | 1.0 | 21.0 |
| Comparative Example 1 | 400 | 120 | Atmospheric pressure | 690 | 1.0 | 25.0 |
| Comparative Example 2 | 800 | 120 | Atmospheric pressure | 690 | 1.0 | 49.6 |
| Comparative Example 3 | 450 | 190 | Atmospheric pressure | 690 | 1.0 | 23.0 |
| Comparative Example 4 | 450 | 190 | Atmospheric pressure | 710 | 1.0 | 24.0 |

COMPARATIVE EXAMPLE 5

A $NH_4VO_3$ aqueous solution was prepared by adding citric acid and $NH_4VO_3$ to water at a molar ratio of 1:2.27 and dissolving. A catalyst precursor solution, which is a clear aqueous solution, was prepared by mixing $Co(NO_3)_2 \cdot 6H_2O$ with the $NH_4VO_3$ aqueous solution so as to have a Co:V molar ratio of 10:1.

Meanwhile, a support containing 40 wt % or more of AlO(OH) was prepared by performing first thermal treatment of aluminum hydroxide ($Al(OH)_3$) in an air atmosphere at 400° C. for 4 hours.

The support was mixed with the catalyst precursor aqueous solution such that 24 mol of Co and 2.4 mol of V were contained in the catalyst precursor aqueous solution with respect to 100 mol of Al in the support.

The catalyst precursor aqueous solution was allowed to be supported by the support in a thermostatic bath at 60° C. for 5 minutes, and then dried in an air atmosphere at 120° C. for 12 hours. Subsequently, second thermal treatment was carried out in an air atmosphere under atmospheric pressure (while the container was open) at 690° C. for 4 hours, and thus a supported catalyst was prepared.

1.0 g of the supported catalyst was loaded in the lower part of a quartz tube having an inner diameter of 55 mm located in a fluidized bed reactor. An inner temperature of the fluidized bed reactor was increased to 690° C. and maintained, and then synthesis was carried out for 2 hours while flowing nitrogen and ethylene gas at a volume ratio of 3:1 and a rate of 3.2 L/min so as to prepare a bundle-type carbon nanotube (35.5 g).

COMPARATIVE EXAMPLE 6

An entangled-type nanotube (18 g) was prepared by the same method as described in Example 1, except that a $NH_4VO_3$ aqueous solution was prepared by adding citric

REFERENCE EXAMPLE 1

An entangled-type carbon nanotube (Manufacturer: LG Chem Ltd.) was used.

REFERENCE EXAMPLE 2

An entangled-type carbon nanotube (Manufacturer: Bayer, Trade Name: C150P) was used.

EXPERIMENTAL EXAMPLE 1

Using the same methods as described below, the morphology of a secondary structure, a bulk density, a tap density, a production yield, and a BET specific surface area of each of the carbon nanotubes in the examples, the comparative examples and reference examples were measured, and the results are shown in Table 2 below.

1) Morphology of secondary structure and particle size: A particle size and the morphology of a secondary structure of a CNT were observed using a scanning electron microscope.

2) Bulk density: After powder was added to a 25 ml cylinder (Manufacturer: Ronyes, Material: glass) having a known weight, a weight was measured, and a bulk density was calculated according to the following Equation 3.

Bulk density ($kg/m^3$)=weight of carbon nanotube (kg)/volume of carbon nanotube ($m^3$)   <Equation 3>

3) Tap density: A 5 ml cylinder (Manufacturer: Ronyes, Material: glass) was put on a scale and then adjusted to a zero point. The cylinder was tilted, and 5 ml of a carbon nanotube was carefully added. After a volume was measured by reading a mark by positioning the height at eye level, the cylinder was put on a scale and weighed. After gently tapping the cylinder on a table approximately 100 times, a volume was measured by reading a mark on the cylinder. Then, a tap density was calculated according to Equation 4 below.

Tap density ($kg/m^3$)=weight of bundle-type carbon nanotube (kg)/volume of bundle-type carbon nanotube after tapping 100 times ($m^3$)   <Equation 4>

4) Production yield: [(total weight of the prepared carbon nanotube)−(total weight of the used supported catalyst)]/(total weight of the used supported catalyst)

5) BET specific surface area ($m^2/g$): A specific surface area was calculated from a nitrogen gas adsorption amount using BELSORP-mini II (Trade Name, Manufacturer: BEL Japan, Inc.) at a liquid nitrogen temperature (77K).

TABLE 2

| Classification | Example 1 | Example 2 | Example 3 | Example 4 |
|---|---|---|---|---|
| Morphology of secondary structure | Bundle-type | Bundle-type | Bundle-type | Bundle-type |
| Bulk density | 29.6 | 33.9 | 35.4 | 35 |
| Production yield | 16.8 | 17.9 | 20.0 | 20.0 |
| Tap density | 49 | 54.7 | 51.6 | 52.1 |
| Bulk density/Production yield | 1.76 | 1.90 | 1.77 | 1.75 |
| Tap density/Bulk density | 1.65 | 1.61 | 1.46 | 1.49 |
| BET specific surface area | 210 | 185 | 170 | 170 |

TABLE 3

| Classification | Comparative Example 1 | Comparative Example 2 | Comparative Example 3 | Comparative Example 4 | Comparative Example 5 |
|---|---|---|---|---|---|
| Morphology of secondary structure | Bundle-type | Bundle-type | Bundle-type | Bundle-type | Bundle-type |
| Bulk density | 21.1 | 35.8 | 21.4 | 22.8 | 41 |
| Production yield | 24.0 | 48.6 | 22.0 | 23.0 | 34.5 |
| Tap density | 34.2 | 58.6 | 34.4 | 35.3 | 86 |
| Bulk density/Production yield | 0.88 | 0.74 | 0.97 | 0.99 | 1.19 |
| Tap density/Bulk density | 1.62 | 1.64 | 1.61 | 1.55 | 2.1 |
| BET specific surface area | 250 | 216 | 240 | 230 | 248 |

TABLE 4

| Classification | Comparative Example 6 | Comparative Example 7 | Reference Example 1 | Reference Example 2 |
|---|---|---|---|---|
| Morphology of secondary structure | Entangled-type | Bundle-type | Entangled-type | Entangled-type |
| Bulk density | 75 | 35 | 172 | 150 |
| Production yield | 17 | 9 | 44 | 20 |
| Tap density | 103 | 55 | 208 | 175 |
| Bulk density/Production yield | 4.41 | 3.38 | 3.91 | 7.5 |
| Tap density/Bulk density | 1.37 | 1.57 | 1.21 | 1.17 |
| BET specific surface area | 210 | 200 | 220 | 200 |

EXPERIMENTAL EXAMPLE 2

A conductive material dispersion was prepared by gradually adding each of the carbon nanotubes in the examples, the comparative examples and the reference examples to a dispersion medium such as N-methylpyrrolidone. Then, the maximum dispersion concentration of the carbon nanotube that can be contained in the conductive material dispersion was measured, and then listed in Table 5 below.

TABLE 5

| Classification | Maximum dispersion concentration (wt %) |
|---|---|
| Example 1 | 2.0 |
| Example 2 | 2.5 |
| Example 3 | 3.5 |
| Example 4 | 3.5 |
| Comparative Example 1 | 1.25 |
| Comparative Example 2 | 1.25 |
| Comparative Example 3 | 1.25 |
| Comparative Example 4 | 1.5 |
| Comparative Example 5 | 1.25 |
| Comparative Example 6 | 3.5 |
| Comparative Example 7 | 1.25 |
| Reference Example 1 | 3.5 |
| Reference Example 2 | 3.5 |

Referring to Table 5, it can be confirmed that the bundle-type carbon nanotubes of Examples 1 to 4 are dispersed in a dispersion medium at a higher concentration than the bundle-type nanotubes of Comparative Examples 1 to 5.

From such a result, it can be confirmed that only the bundle-type carbon nanotubes satisfying both Equations 1 and 2 can be dispersed in a dispersion medium at a high concentration.

Meanwhile, since the bundle-type carbon nanotubes of Comparative Examples 1 to 5 were prepared by a preparation method which does not satisfy the second thermal treatment conditions of the present invention, Equation 1 or 2 could not be satisfied, and therefore, the bundle-type carbon nanotube could not be dispersed in a dispersion medium at a high concentration.

Since the organic acid and the vanadium-based compound were included at a molar ratio less than a molar ratio suggested in the present invention in the preparation of a catalyst precursor in the preparation process, the entangled-type carbon nanotube of Comparative Example 6, rather than a bundle-type carbon nanotube, was prepared.

Since the organic acid and the vanadium-based compound were included at molar ratio in excess of a molar ratio suggested in the present invention in the preparation of a catalyst precursor in the preparation process, the bundle-type carbon nanotube of Comparative Example 7 was prepared as a bundle-type carbon nanotube that does not satisfy Equation 1, and therefore, could not be dispersed in a dispersion medium at a high concentration.

The invention claimed is:

1. A bundle-type carbon nanotube which has a bulk density of 25 to 45 kg/m³, and satisfies the following Equations 1 and 2:

$$1.0 \leq x/y \leq 3.0 \quad \text{<Equation 1>}$$

$$1.3 \leq z/x \leq 2.0 \quad \text{<Equation 2>}$$

wherein x is a number representing a bulk density (units: kg/m³) of the bundle-type carbon nanotube, y is a number representing a production yield of the bundle-type carbon nanotube, wherein production yield=[(total weight of the prepared carbon nanotube)−(weight of supported catalyst used in preparation)]/(weight of supported catalyst used in preparation), and z is a number representing a tap density (units: kg/m³) of the bundle-type carbon nanotube.

2. The bundle-type carbon nanotube of claim 1, wherein the value of Equation 1 is 1.5 to 2.5.

3. The bundle-type carbon nanotube of claim 1, wherein the value of Equation 2 is 1.4 to 1.7.

4. The bundle-type carbon nanotube of claim 1, wherein a production yield of the carbon nanotube is 10 to 40.

5. The bundle-type carbon nanotube of claim 1, wherein a tap density of the carbon nanotube is 35 to 70 kg/m³.

6. The bundle-type carbon nanotube of claim 1, wherein a specific surface area of the carbon nanotube is 150 to 300 m²/g.

7. A conductive material dispersion comprising the bundle-type carbon nanotube of claim 1.

\* \* \* \* \*